United States Patent [19]

Tsao

[11] Patent Number: 5,535,302
[45] Date of Patent: Jul. 9, 1996

[54] METHOD AND APPARATUS FOR DETERMINING IMAGE AFFINE FLOW USING ARTIFICAL NEURAL SYSTEM WITH SIMPLE CELLS AND LIE GERMS

[76] Inventor: Tien-Ren Tsao, 12405 Venice Pl., Silver Spring, Md. 20904

[21] Appl. No.: 352,140

[22] Filed: Dec. 1, 1994

[51] Int. Cl.$^6$ .............................. G06E 1/00; G06E 3/00; G06T 7/20
[52] U.S. Cl. ................. 395/21; 395/22; 395/23; 395/24; 382/107; 382/156; 382/157; 382/158; 382/103; 382/291; 348/699
[58] Field of Search ................. 395/21, 24, 22, 395/23; 382/107, 158, 156, 157, 103, 291; 348/699

[56] References Cited

U.S. PATENT DOCUMENTS

| | | | |
|---|---|---|---|
| 5,067,160 | 11/1991 | Omata et al. | 382/1 |
| 5,241,608 | 8/1993 | Fogel | 382/16 |
| 5,280,530 | 1/1994 | Trew et al. | 382/1 |
| 5,365,603 | 11/1994 | Karmann | 382/48 |
| 5,422,961 | 6/1995 | Simard | 382/224 |
| 5,430,809 | 7/1995 | Tomitaka | 382/173 |
| 5,489,949 | 2/1996 | Jeong et al. | 348/699 |

FOREIGN PATENT DOCUMENTS

| | | | |
|---|---|---|---|
| 04-40576 | 2/1992 | Japan | G06F 15/70 |
| 06-150007 | 5/1994 | Japan | G06F 15/70 |

OTHER PUBLICATIONS

Daugman, J. D., "Networks for Image Analysis:Motion and Texture," IJCNN, Jun. 1989, pp. 1–190–193.
Watson, A. B., "Model of human visual–motion sensing," J. Opt. Soc. Am. A., vol. 2, No. 2, 1985, pp. 322–341.
Hoffman, W. C., "The neuron as a lie group germ and a lie product," J. Aplied MAth.V.XXV, No. 4, Jan. 1968, pp. 423–440.

Primary Examiner—Raymond J. Bayerl
Assistant Examiner—A. Katbab

[57] ABSTRACT

A method and apparatus is provided to determine image affine flow from time-varying imagery. The novel artificial neural computational system of a cortical hypercolumn comprising a plurality of specific orientation (SO) columns and a least square error fitting circuit is based on a Lie group model of cortical visual motion processing. Time-varying imagery, comprising intensity imagery and time-derivative imagery is provided to a plurality of specific orientation (SO) columns comprising simple cells and Lie germs. The cortical representation of image time derivative and affine Lie derivatives are extracted from responses of simple cells and Lie germs, respectively. The temporal derivative and affine Lie-derivative information obtained from each specific orientation (SO) columns is applied to least square error fitting analog circuit having a three layer multiplicative neural architecture to determine image affine flow components in accordance with an error minimization gradient dynamical system technique.

20 Claims, 7 Drawing Sheets

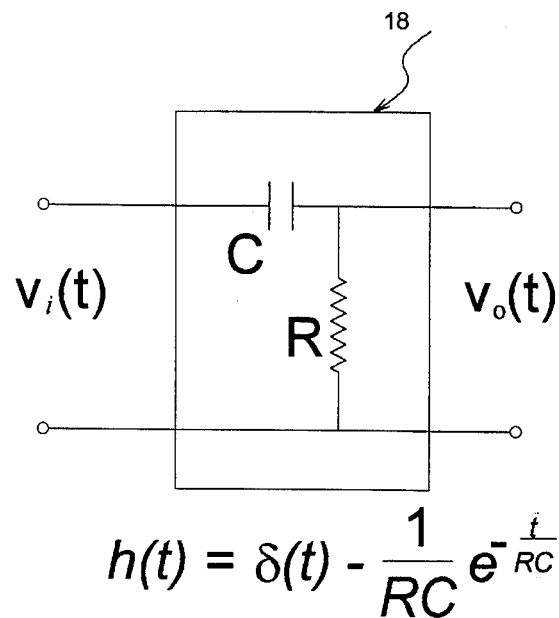
FIG. 1
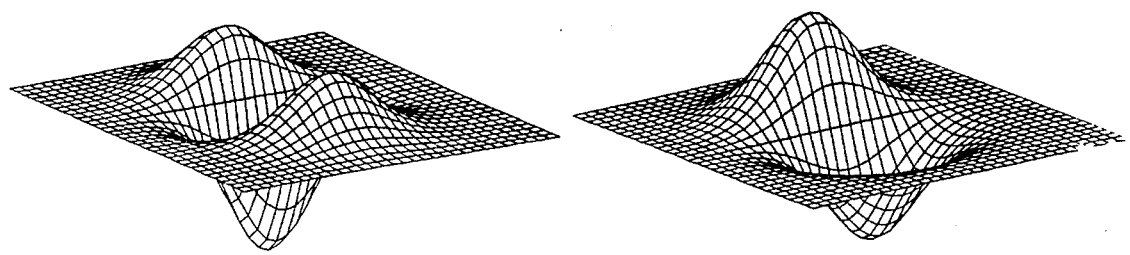
FIG. 2A   FIG. 2B

METHOD AND APPARATUS FOR DETERMINING IMAGE AFFINE FLOW USING ARTIFICAL NEURAL SYSTEM WITH SIMPLE CELLS AND LIE GERMS

BACKGROUND OF THE INVENTION

1. Field of the Invention

The invention relates generally to a method and apparatus for extracting motion information from visual stimuli and, more particularly, to an artificial neural system for determining the affine flow, i.e., the parameters of local image affine transform between two consecutive frames in a temporal sequence of images. The invention further relates to an image motion analysis system comprising a plurality of specially constructed geometric computing devices simulating simple cells in visual cortex of primates and functioning as a reference frame within the scope of a hypercolumnar (HC) organization of visual cortex for coding intensity image data and its time derivative, a plurality of specially constructed geometric computing devices simulating Lie germ type hypercomplex cells in visual cortex of primates functioning as infinitesimal generators of the two dimensional affine Lie group for computing Lie derivatives of intensity images in the HC-coding, and a feedback circuit for determining local image affine flow from the time derivatives and Lie derivatives of the intensity image in the HC-coding.

2. Description of the Related Art

Machine vision has many applications such as robotics control, automatic target recognition and classification for ballistic operations. Vision machine generally process raw sensory data from their environment to extract meaningful information in order to interact flexibly with the environment.

Although motion perception represents a relatively small portion of vision processing, the extraction of motion in the visual field provides signals which are useful in tracking moving objects and in determining the distance of an object from the viewer. Further motion is important to image segmentation and multisensory fusion. For example, an animal which is camouflaged in a wooded scene is generally perceived readily once it moves because the wooded scene can, on the bases of motion characteristics, be segmented into regions of homogeneous motion. Regions exhibiting similar kinetic behavior can be associated in multiple sensor imagery to support associations of spectral attributes. Spectral attribute associations, in turn, support detection and classification processes which are crucial to automatic target recognition.

Particularly, affine flow computation can further be used in realtime data processing in photo databases applications. For example, multiple image fusion for same zone of visual view is needed to generate a photo-real perspective scene from large quantity raw satellite imagery taken from various locations. Much of time spent in geo-correcting is spent in finding affine differences of overlapped areas of images taken at different locations by satellites. Current methods in finding affine differences by trying and error confronts with combinatoral complexity and is difficult to achieve realtime performance.

Machine vision systems are generally modeled after biological visual systems. Vertebrates begin the process of generating visual representations by projecting light from a visual scene through a lens in their eyes onto the retina. The retina comprises a two-dimensional grid of photoreceptor for sensing the light and for generating an analog neural potential, which is proportional to the logarithm of the intensity of the light at a corresponding point in the image. The light incident each photoreceptor comes from the receptive field of that photoreceptor. Thus, the location of a photoreceptor on the retina is useful to encode the direction to the light source in real space. Multiple, two-dimensional layers of neurons in the retina process and transmit output signals corresponding to light source location information through the optic nerve to two-dimensional layers of neurons in the brain in accordance with a conformal, retinotopic mapping, which maintains the relative spatial locations of the output signals. Accordingly, receptive fields of adjacent neurons correspond to adjacent regions of the visual field.

The large ganglion cells in the retina are responsible for processing the time derivatives of the luminance information. The amacrine cells and the cone bipolar cells also participate in the time derivative computation. In C. A. Mead, *Analog VLSI and Neural Systems* (Addison-Wesley Publishing Company, Inc., 1989), there is a derailed description of the neural synaptic mechanism of the time derivative computation of signals and its analog implementation. With reference to FIG. 1, using the classical electrical engineering method the time derivatives can be measured by the current through a capacitor. The current-type signal then can be turned back into a voltage by wiring a resistor in series with the capacitor.

In the retina, both the light intensity and its time derivative are continuously sensed but discretely sampled by the ganglion cells. Thus every temporal sample of the visual information sensed by the retina is a frame including a pair of images, one for intensity of luminance and one for the time derivative of the intensity. This concept of an image frame is different from the conventional concept of the image frame, but is more like the "frames" actually being sampled by retinal ganglion cells. We will call it a complete retinal frame.

As neural processing of visual information progresses, representations of light source become more complex. For example, the retina itself performs transformation from simple intensity to more complex representations such as local averages of intensity with Gaussian weight functions, Laplacians of Gaussian (LOG) operations, and time derivatives of intensity. Thus, signals from the photoreceptor are transformed through several layers of neural processing before transmission through the optic nerve to the brain. Finally, the visual centers of the brain, i.e., the visual cortex, construct models of three-dimensional space using the spatiotemporal patterns of output signals received from the retina.

It was known that the visual cortex of primates has columnar organization. Columns are orthogonal to the cortical layering. The pyramid cells of a column all respond to visual stimulus from a small zone of view field, and with same preferred orientation. A cortical hypercolumn is defined to embraces all preferred orientations. The simple cells are linear. The assembly of simple cells within a cortical hypercolumn (HC) provides a linear reference frame for local cortical representation of the visual stimulus from the small zone of view field. The neural receptive fields are not rigidly locked to absolute retinal coordinates. It is also known that each cortical neuron receives signal from hundreds or thousands of other neurons. Thus the cortical representation of visual information in an HC-reference frame is substantially different from that of the retinal images.

An important aspect of visual motion analysis is determining how the information relating to the displacement of the visual stimulus is extracted and represented in a vision system. Two forms of neural organization of a vertebrate's visual pathway are known to be relevant to the representations and processes of the displacement of visual stimuli. These neural organizational forms include the topological retinotopic mapping in a vertebrate's visual pathway and the visual receptive fields along the visual pathways between the retina and the visual cortex. This cortical neural organization has aided the development of representation schemes for spatial relations of visual stimuli. For example, researchers have found that by taking the zero-crossings of the Laplacian of Gaussian signals as a primal representation of visual stimuli, the basic positional information can be represented as a bit map. In general, when a visual stimulus is detected as a feature, the position of its cortical representation represents the spatial location of the stimuli in the visual field. If a feature is shifted to a new location, the displacement of feature can be measured from the difference between these two locations. If the feature detection and feature matching is solved, the measurement of the displacements of the features from one frame to another is straightforward. The problem of matching the features, however, is difficult solve. For example, it is difficult to determine whether a generic feature should correspond to another particular generic feature when there are many candidates. Moreover, the problem of feature matching itself is not even a well formulated one since it raises the issue of what kinds of features should be considered generic.

As stated previously, the cells in the visual cortex have a receptive field property. When a visual stimulus is spatially shifted within the scope of the sensitive area of the same receptive field, the response of a receptive field changes. The motion problem then becomes one of whether the spatial shift of the visual stimulus can be determined from the difference of the response of cells with certain types receptive fields. Important differential response models are derived from the Fourier theory of visual information processing, which regarding the cortical simple cells as Fourier analyzer of images, or from Gabor theory of visual information processing, which regarding cortical simple cells as Gabor transformers of images. More often, Gabor filters are regarded as local spatial frequency analyzer, such as described in the following three publications: (1) Watson, A. and Ahumada, A., "Model of Human Visual Motion Sensing", *Journal of the Optical Society of America*, A. Vol. 2, No. 2, pp. 332–341 (February 1985); (2) Daugman, J. G., "Networks for Image Analysis: Motion and Texture", *Proceedings of International Joint Conference on Neural Networks '89 Washington D.C.*(June, 1989); and (3) Heeger, D., "Optical Flow Using Spatiotemporal Filters", *International Journal of Computer Vision*, pp. 279–302 (1988). Localized Fourier analysis approaches to visual motion analysis, however, has limitations. Visual motion is rarely homogeneous in large image regions. If the spectral analysis is performed over a very small image region for a short time period, substantial uncertainty is associated with the result. Image motion cannot be accurately determined based on uncertain spectral information. For that reason, for example, in Teri, B. Lawton's invention disclosed in U.S. Pat. No. 5,109,425, Gabor filters are used only for predicting the direction of movement instead for quantitatively measuring visual motion.

In computer vision, the quantitative measurement of image motion was traditionally formulated as optical flow, i.e., the pixel motion. The optical flow computation has some substantial theoretical and practical difficulties. The optical flow formulation treats the pixels as something like particles and can be assigned with "velocity." However, when object or viewer have motion, the images may have scale, shear, rotation, and even more complex changes depending on the surface shape. The concept "velocity field" provides no model for the complexity in real image motion.

In recent years, the concept of "affine flow" has began to be recognized. Pixels are artificially defined (smallest) image regions. Unlike particles in physical world, in the process of motion, pixels are in general not corresponding to any invariant part of the visible surface for which the image is taken. For example, when an object is approaching, a part of the visible surface originally being represented by one pixel can later be represented by several pixels and vise versa. However, when a visible surface is locally flat, the change of its image during motion can be quite accurately described by local affine transforms. When in case the whole visible surface can be viewed as a flat surface, affine transform can be a global description of the image change. In general, affine flow should be computed at each location and an affine flow field is needed for an accurate quantitative description of the image motion. In contrast to the pointwise defined optical flow, the affine flow of an image point is defined for a small neighborhood of that point.

Although affine flow provides a better model for quantitative image motion measurement, it is difficult to compute the affine flow parameters from time-varying image data. Images are taken from environment and have no prior known analytical form. In general, they are not continuous functions on image plane. Lacking of analytical means, the computer vision approach to affine flow can be characterized by trying and error which combines image warping and matching. First transforming (warping) one image according to some possible combination of affine parameters, then test if the transformed image matches the other image. The process will continue until a qualified match is found. And the parameters result in this match will be chosen as the right answer. Some special computer hardware and algorithms, such as pyramid transform and image warper may added to speed up the process of determining the parameters of affine transforms.

There are total of six parameters need to be determined in affine flow computation. Even with the help of algorithmic sophistication and specially designed hardware, it must confront with tremendous computational complexity from the combination of the six affine parameters. If each parameter has 10 candidate values, the total candidates for try and error search is one million. Each time the computer system have to warp one image and then find correlation with the other. The computer system also have to find the best match in order to determine the affine parameters of the transformation between two image patches. The computation is very time consuming. On the other hand, for most applications, visual motion analysis must be performed in realtime.

It is now clear to many researchers in biological vision system field that an important aspect of vision process is the geometric relations within the optical influx and for that reason the "front-end-visual-system" is basically a geometric engine (J. J. Koenderink "Design Principles for a Front-End Visual System," in NATO ASI Series Vol. F41 Neural Computers, Springer-Verlag Berin Heidelberg 1988). As a geometric engine, there should be geometric computing devices in neural system that serve as coordinate systems, and geometric computing devices in neural system that serve as infinitesimal generators of Lie transformation groups.

The concept of neural mechanism of geometric transformation group was proposed in earliest effort of neural computing research by Pitts and McCulloch (1947, "How we know universals: the perception of auditory and visual forms," Bulletin of Mathematical Biophysics 9:127–147). Later, Hoffman proposed a neural structure of Lie germ serving as infinitesimal generators of Lie transformation group (Hoffman W. C. "The neuron as a Lie group germ and a Lie product," Quarterly of Applied Mathematics, 25, 1968, 437–471). Lacking of derailed knowledge of receptive field properties of cortical cells, which hold the key to understanding the cortical visual processing, these early efforts on neural computing mechanism of geometric transformations remains to be conjectures. No concrete implementation was derived.

Decades of neurophysiological research on the visual pathways of primates and cats and the psychophysical study of human vision have amassed a tremendous volume of scientific data on receptive field properties of the cells in visual cortex. It was known that the cortical simple cells have receptive fields that are spatially oriented and bandpass, i.e., they have not only the higher-end cut of spatial frequency response, but also a lower-end frequency cut. The receptive fields of cortical pyramid cells are generally being modeled with analytical functions. For example, isotropic receptive fields of cortical cells were modelled by LOG (Laplacian of Gaussian) or DOG (difference of Gaussian) functions, and the receptive fields of orientation selective simple cells were modelled as Gabor functions in the early 1980s when scientists D. Pollen and S. Ronner found that simple cortical cells have Gabor-type impulse response profiles which appear pairwise with a quadrature phase difference. Others suggest using directional derivatives of Gaussian type receptive fields for modelling orientation selective simple cells (Young, R. A.: The Gaussian derivative theory of spatial vision: Analysis of cortical cell receptive field line-weighting profiles. General Motors Research Publication GMR-4920, 1985.)

One of the most important new advances in the research of the physiological properties of cortical cells is the discovery of the dynamical warping in the cortical receptive fields. The great importance of this discovery is that it provides a key toward understanding the cortical process of relative motion perception, the cancellation of ego motion (motion constancy), perceptual stabilization, and other important motion-related perceptual functions. Anderson and Van Essen ("Reference Frames and Dynamic Remapping Processes in Vision," in *Computational Neuroscience*, Edited by E. L. Schwartz, The MIT Press, Cambridge, Mass., 1990) have proposed a multilayered shift register architecture between the visual cortex and retina to implement the dynamical shift property of receptive fields. The dynamical shift and warping phenomena of receptive fields was considered as indicating the existence of cortical coordinate system in forms of receptive fields of certain types of pyramid cells in the primate visual cortex. Also the observed affine warping of certain cortical receptive fields was considered relating to the transformation of cortical coordinate systems (Bruno Olshausen, Charles Anderson, and David Van Essen: "A Neural Model of Visual Attention and Invariant Pattern Recognition" CNS Memo 18, Caltech Computation and Neural Systems Program, Aug. 6, 1992).

Although Anderson and Van Essen's effort was to derive a plausible neural mechanism for transforming images in order to transform the receptive field ("Shifter circuits: a computational strategy for dynamical aspect of visual processing, *Proceedings on National Academy of Sciences*, U.S.A. 84, 6297–6301, 1987), the concept of transformable cortical receptive fields suggested an alternative computational strategy to the geometric transformations in vision: computing the image transformation indirectly by the conjugate transformation of the cortical receptive fields that compensates the image transformation. There are critical differences between images and receptive fields: images are sensory data collected from environment, receptive fields are a priori possessed by the brain; images has no analytical structure, observed receptive fields demonstrated important analytical structures. The obvious advantageous of adopting the new computational strategy is that not only analytical method can be applied, more importantly, it allows construction of prewired geometric computational devices for particular geometric transformations without requiring image data or processes of learning.

It would be advantageous to have an analytical method for determining the affine flow making use of gradient information of image affine transformation, the Lie derivatives, instead of conducting a brute force try and error type search to determine the affine parameters. It would also be advantageous to have a prewired digital or analog device capable of realtime computing of the affine Lie derivatives of the intensity images. The current invention is motivated to realize these and other advantages.

SUMMARY OF THE INVENTION

The present invention is based on a Lie group model of the cortical processing of visual motion that the hypercomplex cells in the visual cortex of the primates are functioning as Lie germs, i.e., the operators of the infinitesimal generators of the affine Lie transformation group. The present invention provides a method and apparatus for computing image affine flow which realize advantages over and overcomes several shortcomings associated with existing approaches for determining image motion, particularly the affine flow, by using a computational method and apparatus simulating the information process of visual motion in the columnar organization of visual cortex of primates, comprising cortical coding of time derivative information of intensity images by a plurality of simple cells, extracting the Lie derivatives by a plurality of hypercomplex cells, determining affine flow from the, temporal- and affine Lie-derivatives in a neural error minimization circuit. In accordance with one aspect of the present invention, a plurality of geometric computing devices, called HC-reference frame, simulating the simple cells in a hypercolumn of visual cortex, is presented for coding image data and its time derivative. Further, geometric computing devices simulating the hypercomplex cells with Lie germ type receptive fields are analytically constructed in accordance with the chosen HC-reference frame and the Lie differential operations. Further, an architecture of the neural network system for determining affine flow is presented which is based on HC-reference frame, the Lie group model of cortical processing of affine flow, and the dynamical system approach to least square error solution of systems of linear equations.

Accordingly, it is an object of this invention to provide a method which calculate affine flow from time-varying imagery directly from affine Lie derivatives and time derivative of the imagery without try and error, in much the same manner the neural system would determine visual motion.

It is another object of this invention to provide neuron-like geometric computing devices serve as computational means of coding of time-varying imagery and its time derivative consistent with existing analytical models of cortical representations verified in neurobiological research.

It is another object of this invention to provide: neuron-like geometric computing devices serve as computational means of extracting the affine Lie derivatives of images consistent with said analytical model of cortical coding.

It is yet another object of this invention to provide neural-circuit-like dynamical system serve as computational means of further extracting affine flow vector from cortical coding of affine Lie derivatives and time derivative of the time-varying imagery.

BRIEF DESCRIPTION OF THE DRAWINGS

These and other features and advantages of the present invention will be more readily apprehended from the following detailed description when read in connection with the appended drawings, which:

FIG. 1 is a diagram of physical circuit that provides the intensity and the time derivative of an image cell to sample the complete retinal frame.

FIGS. 2A, 2B are perspective views of the receptive field functions $g_1$, $g_2$ the typical even and odd types of specific orientation (SO) simple cells founded in primate visual cortex, respectively;

DETAILED DESCRIPTION OF THE PREFERRED EMBODIMENTS

Figure 3B:
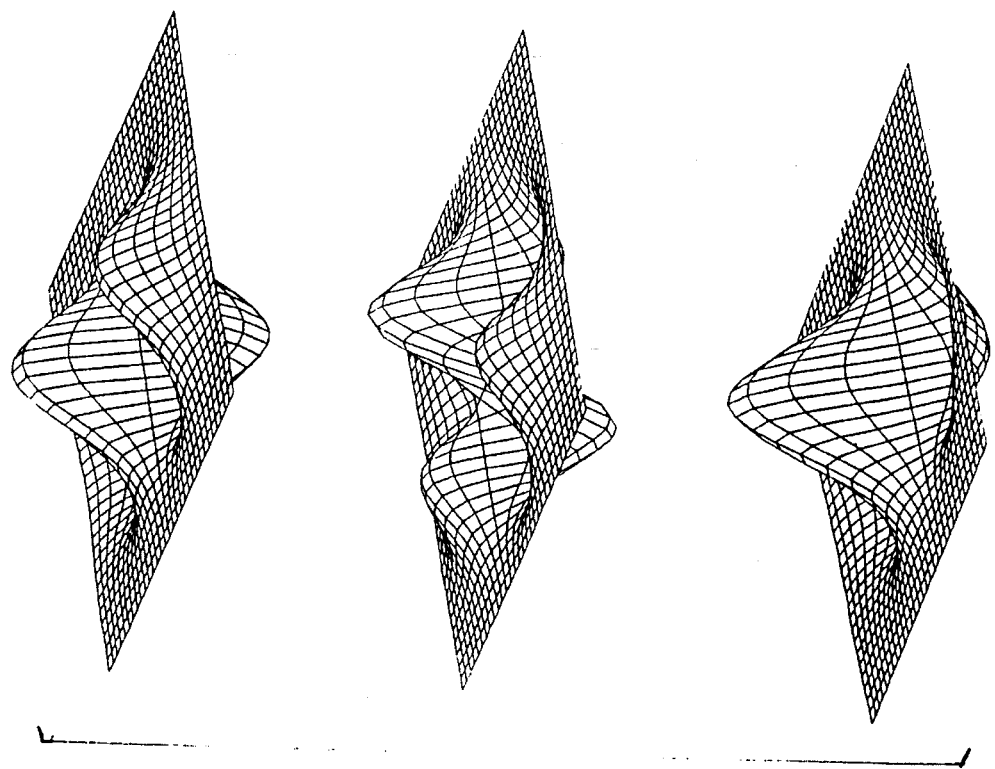
FIGS. 3A, 3B are perspective views of the receptive field functions of Lie germs representing infinitesimal generators $X_1$, $X_2$, and $X_5$ in specific orientation (SO) columns of $g_1$, $g_2$, respectively.

In accordance with the present invention, the intensity value of a small image patch $I(x, y)$ of a visible surface is a square integrable ($L^2$) function: $\iint I^2(x, y)dxdy<\infty$. Here x and y are horizontal and vertical coordinates of intensity pixels.

In accordance with the present invention, the hypercolumn (HC) reference frame comprises n simple cells with differently oriented receptive field functions $g_i(x, y)$, $i=1, \ldots, n$. The receptive field functions of HC-reference frame are chosen to be rapid decent functions to serve the purpose of performing local motion analysis: $g^i \in S$ (the definition of rapid decent functions, see A. H. Zeemanian "Distribution Theory and Transform Analysis," New York, McGraw-Hill, 1965). The receptive field functions are considered as vectors in the dual space of the $L^2$ space of the images: Each $g_i$ is a functional on $L^2$.

With reference to FIG. 2, in the preferred embodiment the HC-reference frame comprising a plurality of specific orientation (SO) simple cells with even-symmetric type receptive field functions and a plurality of SO-simple cells with odd-symmetric type receptive field functions.

The set of values $$\gamma^i = (g_i, I), i=1, \ldots, n. \tag{1}$$

defines a HC-coding for the image patch I, where $(g_i, I)$ is the Hilbert space inner product of I and $g_i$. The linear functionals $g_i$, $i=1, \ldots, n$, constitutes a HC-reference frame.

In accordance with present invention, the temporal changes of time-varying imagery $I(x, y, t)$ are affine transformations with time-varying parameters $\rho(t)$:

$$I(x, y, t) = (A(\rho(t)) \circ I)(x, y), \tag{2}$$

where $A(\rho)$ is a 2D affine transform of image I with parameters $\rho = (\rho_1, \ldots, \rho_6)$:

$$(A(\rho) \circ I)(x, y) = I(x', y') \tag{3}$$

and $$\begin{pmatrix} x' \\ y' \end{pmatrix} = A(\rho) \begin{pmatrix} x \\ y \end{pmatrix} \tag{4}$$

$$= \begin{pmatrix} \rho_1 & \rho_2 \\ \rho_3 & \rho_4 \end{pmatrix} \begin{pmatrix} x \\ y \end{pmatrix} + \begin{pmatrix} \rho_5 \\ \rho_6 \end{pmatrix}.$$

In accordance with present invention, and by further introducing a canonical coordinate of the second kind of the two dimensional affine Lie group (L. Pontrjagin "Topological Groups," Princeton, 1946, Princeton University Press) as parameter $\rho=(\rho_1, \ldots, \rho_6)$, $J(x, y, t)$, the time derivative of the time-varying imagery $I(x, y, t)$, is related to affine flow $\dot\rho_i$, $i=1, 2, \ldots, 6$ as follows:

$$J(x, y, t) = \left( \sum_{i=1}^{6} \dot\rho_i X_i \right) \circ I(x, y, t), \tag{5}$$

where $$\sum_{i=1}^{6} \dot\rho_i X_i$$

is a tangent vector of the 2D affine Lie group $A(R, 2)=\{A(\rho)|\rho \in R^6\}$.

With reference to Equation 1, the n-dimensional vector $(\gamma^1, \ldots, \gamma^n)$ is the coordinate vector of the intensity image $I(x, y)$ in the HC-reference frame. The components of the HC-coordinate vector are differentiable functions of the parameter $\rho$ of the 2D affine group:

$$\gamma^i(\rho) = (g_i, A)(\rho) \circ I), i=1, \ldots, n.$$

Applying reference frame $\{g_j|j=1, \ldots, n\}$ to both sides of Equation 5:

$$\langle g_j, J \rangle = \langle g_j, \sum_{i=1}^{6} \dot\rho_i X_i \circ I \rangle, j=1, \ldots, n. \tag{6}$$

Denoting $(g_j, J)$ by $\Omega_t^j$, $(g_j, X_i \circ I)$ by $\Omega_i^j$, Equation 6 can be rewritten as:

$$\sum_{i=1}^{6} \dot\rho_i \Omega_i^j - \Omega_t^j = 0, j=1, \ldots, n. \tag{7}$$

By introducing vector notations:

$$\vec\Omega_t = (\Omega_t^1, \ldots, \Omega_t^n),$$

and $$\vec\Omega_i = (\Omega_i^1, \ldots, \Omega_i^n), i=1, \ldots, 6,$$

Equation 7 can be put into a vector form:

$$\sum_{i=1}^{6} \rho_i \vec{\Omega}_i - \vec{\Omega}_t = 0. \qquad (8)$$

Here $\Omega_i^j$ can be calculated as follows:

$$\begin{aligned}\Omega_i^j &= \langle g_j, X_i^\circ I\rangle \\ &= \langle X_i^{*\circ} g_j, I\rangle\end{aligned}$$

where $X_i^*$ is the Hilbert space conjugate of the infinitesimal generator of the i-th 1-parameter Lie subgroup of the 2D affine Lie group A(2, R).

With reference to FIG. 3, in the preferred embodiment, the HC-representation of the infinitesimal generators of six 1-parameter Lie subgroups of A(2, R), each comprising n Lie germ type hypercomplex cells with receptive fields described by functions $g_{j,i} = X_i^{*\circ} g_j$, j=1, . . . , n, are constructed to function as Lie differential operators.

Figure 3A:
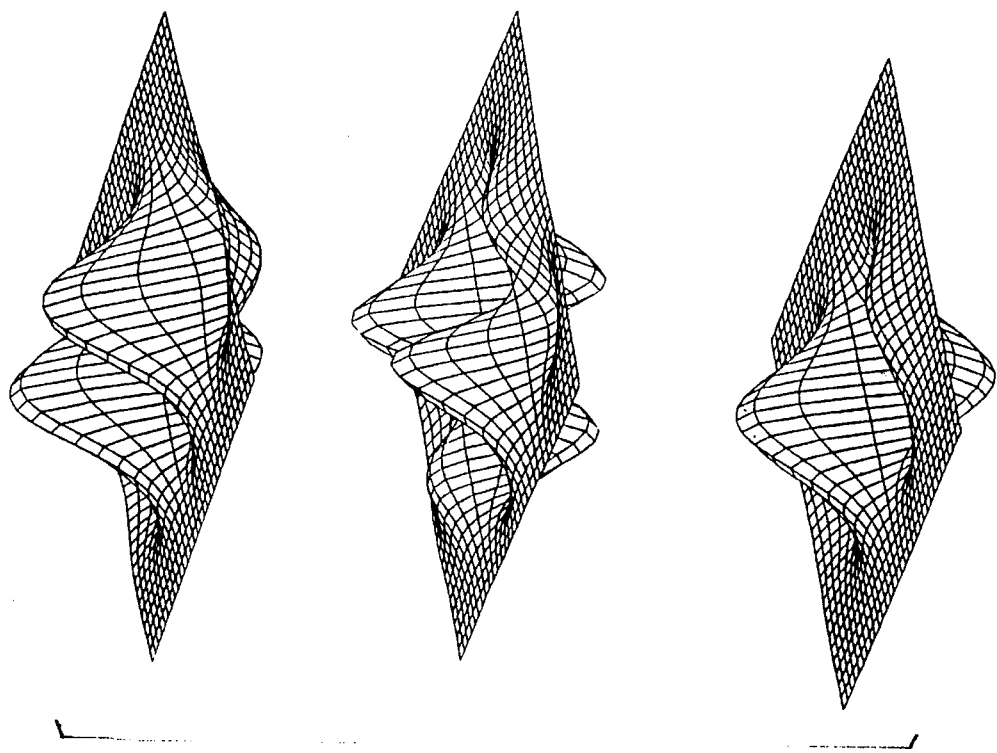

In accordance with the present invention, a novel approach to image motion analysis using simple cells and Lie germs in a cortical hypercolumnar organization will now be described which yields more certain affine flow vector $(\rho_1, \ldots, \rho_6)$ faster than known affine flow computation methods by several order of magnitudes. Hereafter in further discussion, $\rho_i$ instead of $\rho_i$ is used to denote parameters in Equations 7 and 8 for the reason that the time spans between consecutive frames is taken to be one unit and $\rho_i$, i=1, . . . , 6, the time derivatives of affine parameters, are represented by the parameters of affine transforms taken place in between consecutive frames: $\rho_i$, i=1, . . . , 6. A hardware implementation for determining image affine flow using simple cells and Lie germs will subsequently be described in connection with FIGS. 4 through 6. For illustrative purposes, $g_i$ represents j-th simple cell, and $g_{j,i}$, represents j-th Lie germ of i-th infinitesimal generator. FIGS. 2A, 2B provide, respectively, perspective views of the receptive field functions $g_1$, $g_2$ of the typical even and odd types of specific orientation (SO) simple cells founded in primate visual cortex; FIGS. 3A, 3B are perspective views of the receptive field functions of Lie germs of infinitesimal generators $X_1$, $X_2$, and $X_5$ in the specific orientation columns of $g_1$ and $g_2$, respectively.

Figure 4:
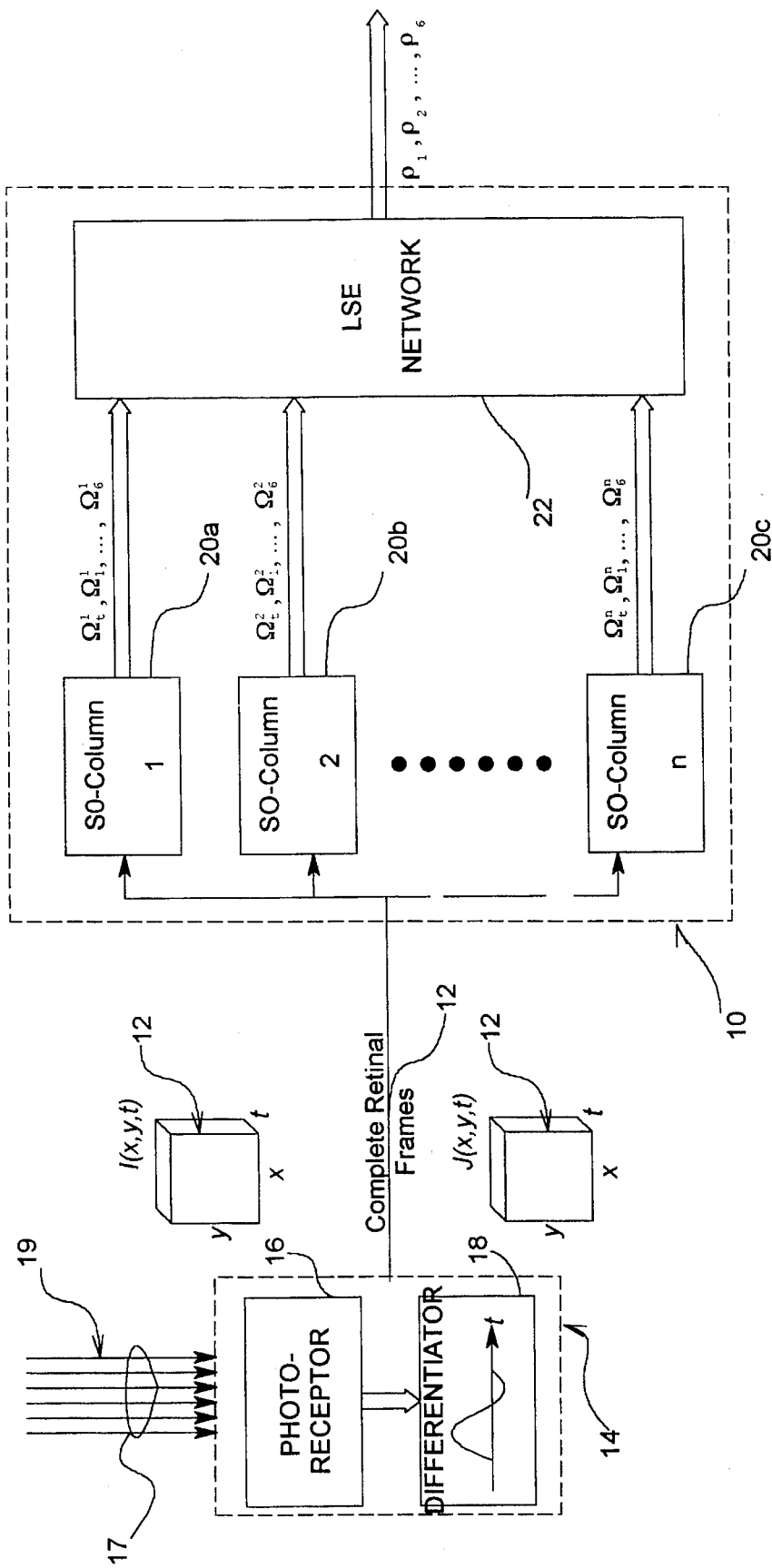
FIG. 4 is a schematic diagram of image affine flow analyzer constructed in accordance with the present invention.

With reference to Equations 7, to sufficiently constrain the variables in the system of linear equations at least six reference vectors are needed in an HC-reference frame: n≧6. To this end and in accordance with the present invention, at each location on the image plane, local image motion information is first extracted by linear functionals in a cortical hypercolumn comprising n simple cells each serve as an HC-reference vector in the dual space of the image space, and 6×n Lie germs each serve as a SO-component of some infinitesimal generator $X_i^*$, i=1, . . . , 6. Particularly, signals $\Omega_i^j$ are extracted by Lie germs $g_{j,i}$, i=1, . . . , 6, j=1, . . . , n. With reference to FIG. 4, time derivatives J is provided by time differentiator. With reference to Equations 7, signals $\Omega_i^j$ then further be extracted from J by SO-simple cells $g_i$, j=1, . . . , n.

With reference to FIG. 4 the Lie group model of cortical processing of local visual motion information in a hypercolumn (HC) described above is employed in an HC-motion analyzer. The HC-motion analyzer 10 is generally operable to determine the local affine flow parameters $\rho=(\rho_1, \rho_2, \rho_3, \rho_4, \rho_5, \rho_6)$ from time-varying complete retinal frame data (I(x,y,t), J(x,y,t)) 12. The complete retinal frame data is preferably obtained from a retina-like image capture device 14, which comprises a photoreceptor 16 for detecting light intensity 17 reflected within the field of vision 19 and creating a temporal, sampled intensity image sequence, and a differentiator 18 for obtaining the temporal derivative of the sampled image sequence. With reference to FIG. 1, the differentiator, for example, can be a capacitive, analog device coupled to the photoreceptor 16 to smooth its output current signal and to subtract from the output current signal the temporal smoothing intensity in order to obtain the temporal derivative of the intensity image. The time-varying signal 12, therefore, comprises successive complete retinal frames of data which are generally simultaneously applied to the inputs of a plurality of specific orientation (SO) columns 20a, 20b, and 20c. As described in further detail below in connection with FIGS. 4, 5, The SO-columns operate in parallel to calculate n components of the HC-vectors: $\vec{\Omega}_1$, $\vec{\Omega}_2$, $\vec{\Omega}_3$, $\vec{\Omega}_4$, $\vec{\Omega}_5$, $\vec{\Omega}_6$, and $\vec{\Omega}_t$. The affine flow determined by the HC-vectors is implicit in the Equation 8 where $$\sum_{i=1}^{6} \rho_i \vec{\Omega}_i - \vec{\Omega}_t = 0.$$

Least Square Error (LSE) network 22 is provided to transform the implicit affine flow information into an explicit six-dimensional affine parameter vector $(\rho_1, \rho_2, \rho_3, \rho_4, \rho_5, \rho_6)$ represents six components of affine flow.

Figure 5:
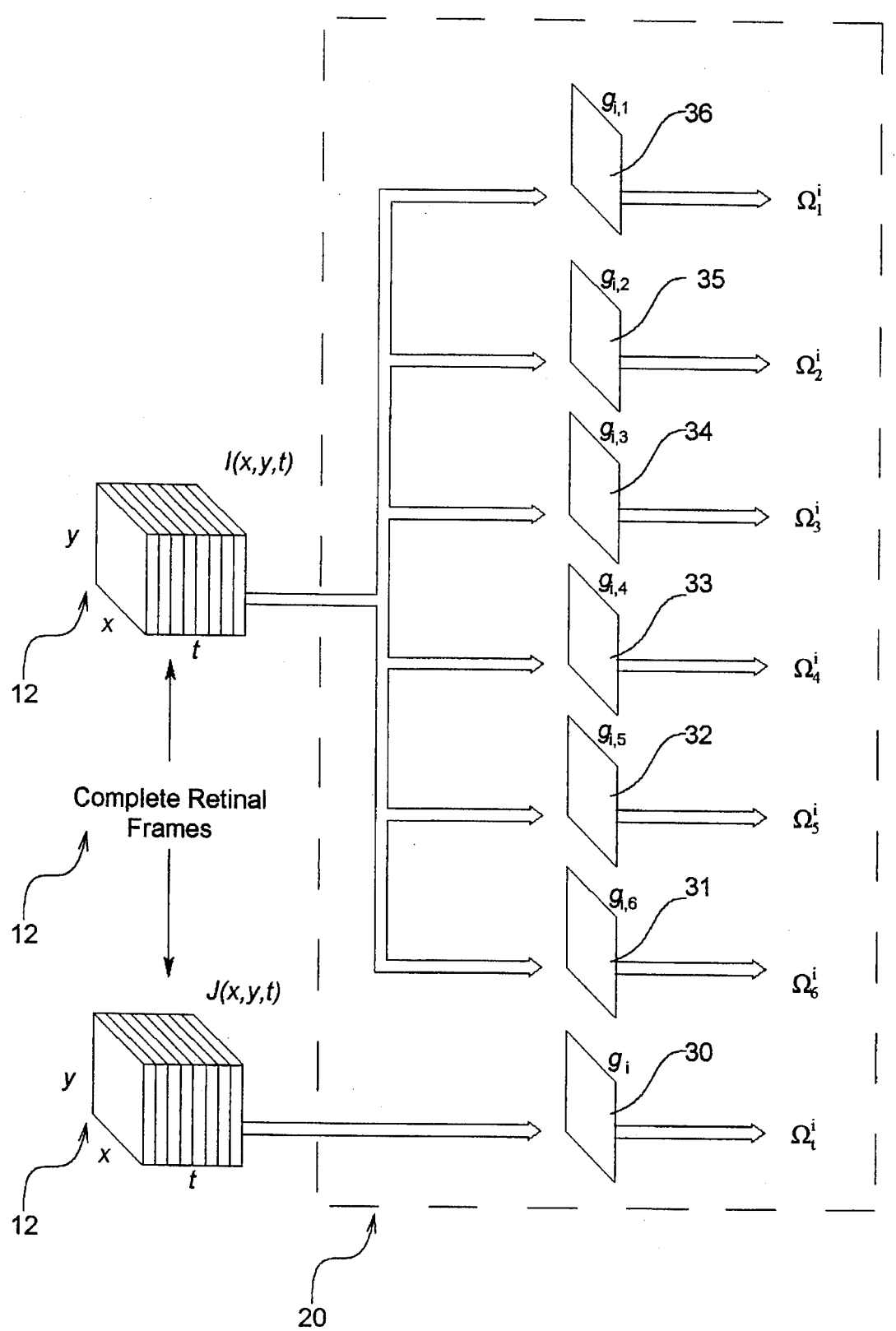
FIG. 5 is a schematic diagram of a specific orientation (SO) column, consisting of a simple cell and six Lie germs.

In FIG. 5 there is depicted an SO-column 20 constructed in accordance with the present invention. The i-th SO-column 20 generally comprises a simple cell 30, and six Lie germs 31, 32, 33, 34, 35, and 36. The output signals of six Lie germs 31, 32, 33, 34, 35, 36, and simple cell 30, represents the i-th components of the HC-vectors $\vec{\Omega}_1$, $\vec{\Omega}_2$, $\vec{\Omega}_3$, $\vec{\Omega}_4$, $\vec{\Omega}_5$, $\vec{\Omega}_6$, and $\vec{\Omega}_t$ which are input signals to the corresponding LSE network 22.

The affine flow information at each location of the sampled image, which is implicit in the quantities: $\vec{\Omega}_1$, $\vec{\Omega}_2$, $\vec{\Omega}_3$, $\vec{\Omega}_4$, $\vec{\Omega}_5$, $\vec{\Omega}_6$, and $\vec{\Omega}_t$, can be made explicit in terms of affine flow having parameter components $\rho_1$, $\rho_2$, $\rho_3$, $\rho_4$, $\rho_5$ and $\rho_6$ by using LSE network 22. As described in further below, a LSE network 22 preferably performs a least square error fitting on the outputs of its corresponding SO-columns 20 to minimize the following error function:

$$E(\rho) = \left\| \sum_{i=1}^{6} \rho_i \vec{\Omega}_i - \vec{\Omega}_t \right\|^2. \qquad (9)$$

This is equivalent to finding flow $(\rho_1, \ldots, \rho_6)$ satisfying the equation $$dE(\rho) = 0 \qquad (10)$$

whereby $$\left( \sum_{i=1}^{6} \rho_i \vec{\Omega}_i - \vec{\Omega}_t \right) \cdot \vec{\Omega}_i = 0, i = 1, 2, \ldots, 6. \qquad (11)$$

Figure 6:
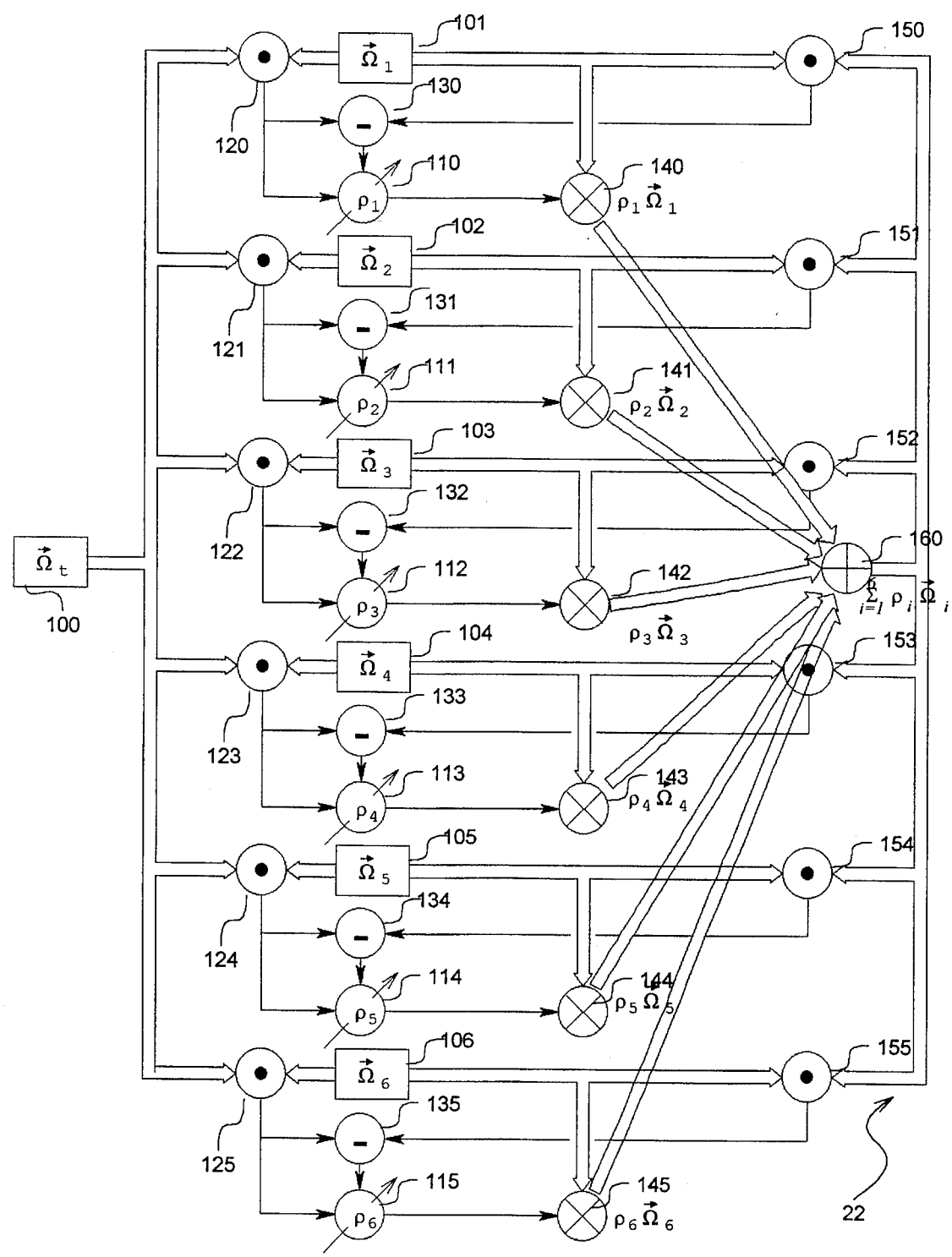
FIG. 6 is a schematic diagram of a least squares error (LSE) circuit constructed in accordance with the present invention.

With reference to FIG. 6, the output signals $\vec{\Omega}_1$, $\vec{\Omega}_2$, $\vec{\Omega}_3$, $\vec{\Omega}_4$, $\vec{\Omega}_5$, $\vec{\Omega}_6$, and $\vec{\Omega}_t$, from n SO-columns 20 (not shown) are provided as input signals 101, 102, 103, 104, 105, 106, and 100, respectively, to the LSE network 22. A first multiplicative layer comprises six neurons 120, 121, 122, 123, 124, and 125 which perform vector multiplication to obtain dot products $\vec{\Omega}_t \cdot \vec{\Omega}_i$, i=1, 2, . . . , 6, respectively, and provide corresponding signals to output layer comprising six neurons 110, 111, 112, 113, 114, and 115. Signals from these neurons are subsequently applied to a second multiplicative layer comprising six scalar multipliers 140, 141, 142, 143, 144, and 145 for computing $\rho_1 \vec{\Omega}_1$, $\rho_2 \vec{\Omega}_2$, $\rho_3 \vec{\Omega}_3$, $\rho_4 \vec{\Omega}_4$, $\rho_5$ $\vec{\Omega}_5$, and $\rho_6\vec{\Omega}_6$, respectively. Output signals from the second multiplicative layer are combined by vector summing circuit 160 to compute $$\sum_{i=1}^{6} \rho_i\vec{\Omega}_i,$$

the corresponding signal for which is applied to a third multiplicative layer. The third multiplicative layer comprises neurons 150, 151, 152, 153, 164, and 155 for computing dot products $$\vec{\Omega}_1 \cdot \sum_{i=1}^{6} \rho_i\vec{\Omega}_i, \vec{\Omega}_2 \cdot \sum_{i=1}^{6} \rho_i\vec{\Omega}_i, \vec{\Omega}_3 \cdot \sum_{i=1}^{6} \rho_i\vec{\Omega}_i,$$

$$\vec{\Omega}_4 \cdot \sum_{i=1}^{6} \rho_i\vec{\Omega}_i, \vec{\Omega}_5 \cdot \sum_{i=1}^{6} \rho_i\vec{\Omega}_i, \text{ and } \vec{\Omega}_6 \cdot \sum_{i=1}^{6} \rho_i\vec{\Omega}_i,$$

respectively. The output signals from the third multiplicative layer are feedback signals which are combined with the output signals from the first multiplicative layer by subtracting circuits 130 131, 132, 133, 134, and 135 to obtain the correcting forces:

$$F_j = \vec{\Omega}_j \cdot \left( \sum_{i=1}^{6} \rho_i\vec{\Omega}_i - \vec{\Omega}_t \right), j = 1, 2, \ldots, 6$$

which adjust output signals $\rho_1$, $\rho_2$, $\rho_3$, $\rho_4$, $\rho_5$, and $\rho_6$ at the output layer are representative of the components of the affine flow vector associated with the local image.

Figure 7:
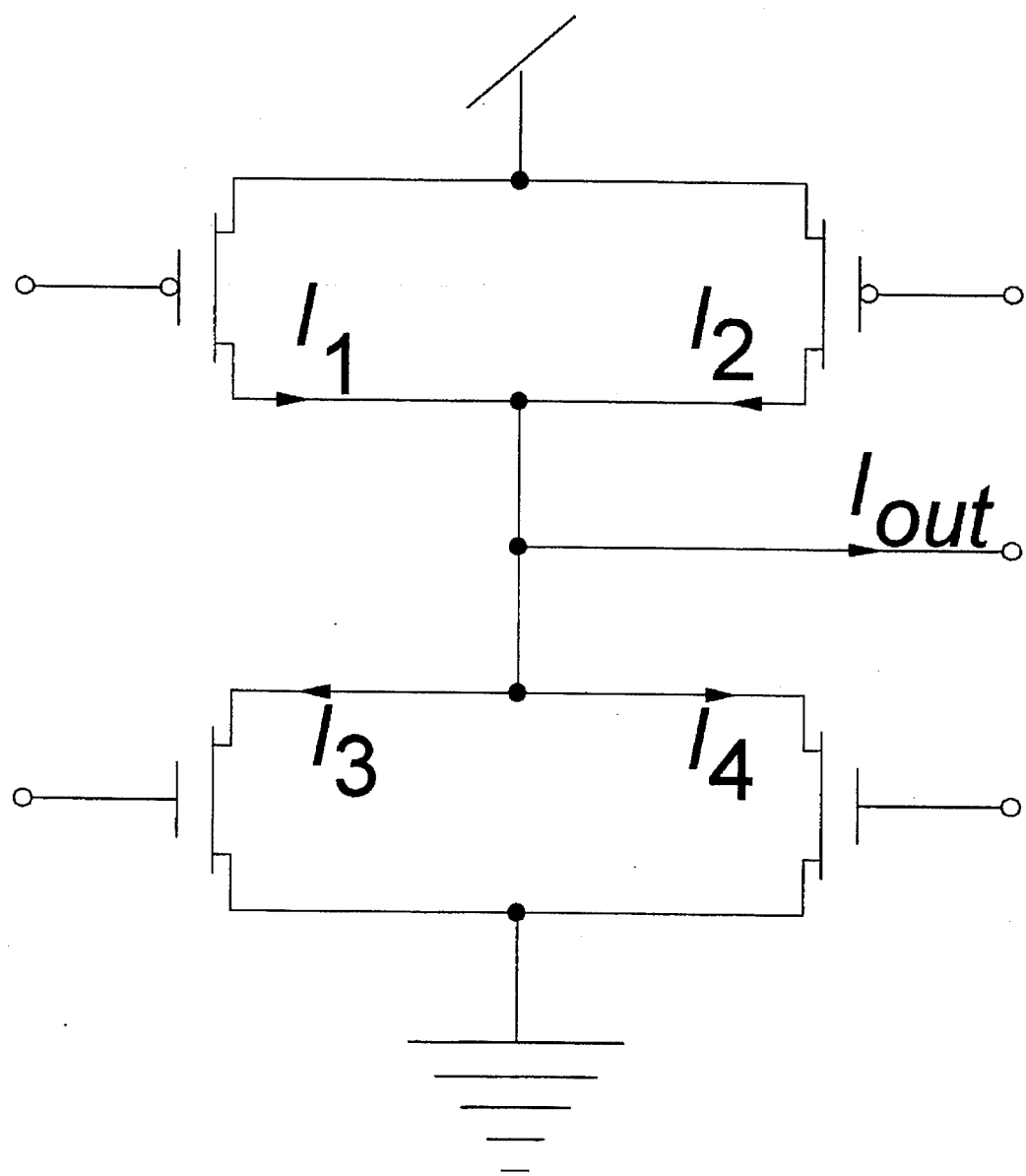
FIG. 7 is a schematic diagram of an analog adding circuit.
Figure 8:
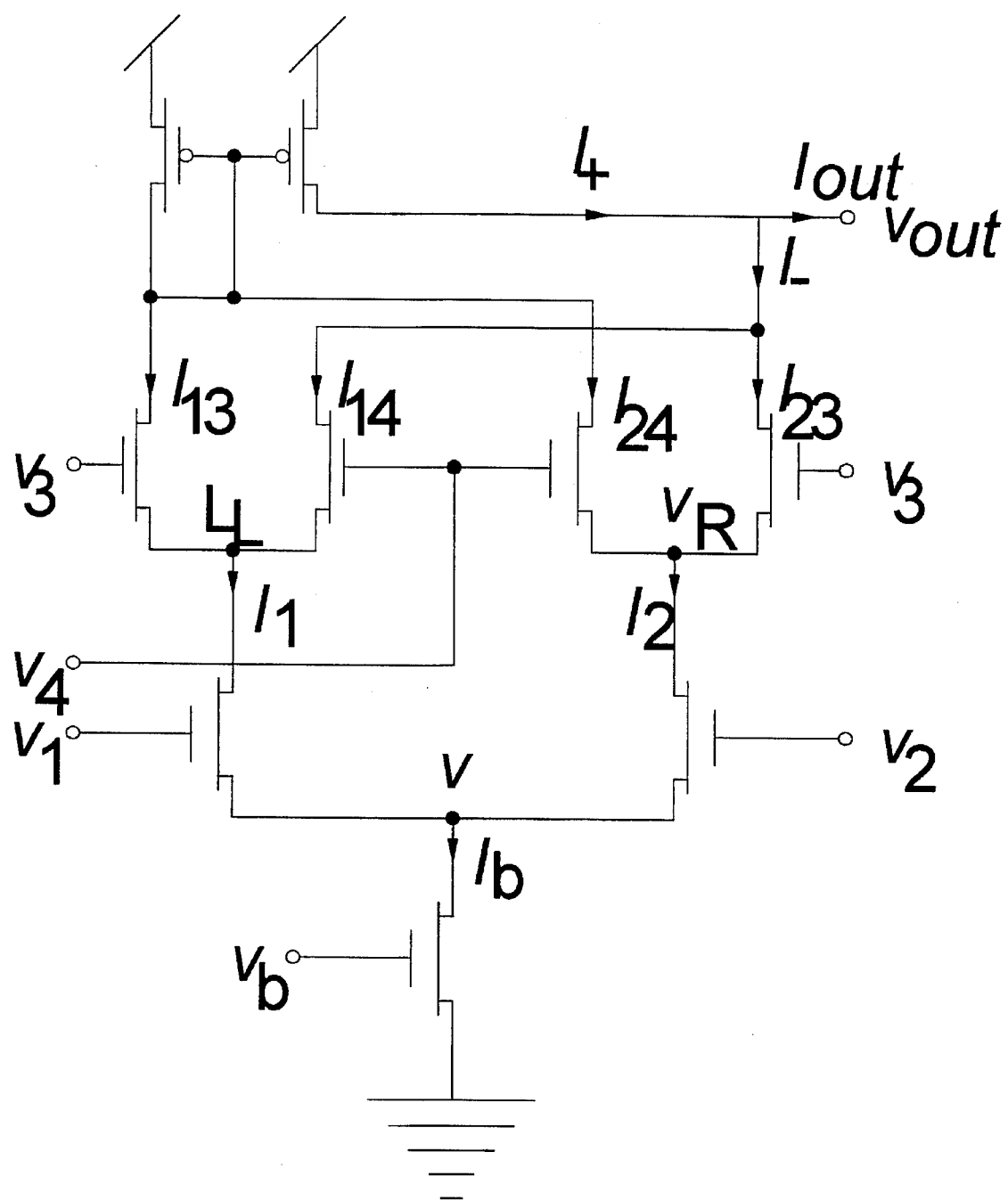
FIG. 8 is a schematic diagram of an analog multiplicative circuit.

As stated previously, the multiplicative network 22 can be implemented as an analog integrated circuit. For example, the subtracting and summing circuits 130, 131, 132, 133, 134, 135, and 160 can each be implemented as a basic Kirchhoff's adder circuit. As shown in FIG. 7, the basic Kirchhoff adder circuit comprises p-channel and n-channel transistors, the drain currents of which are added and subtracted in accordance with Kirchhoff's laws. The scalar multipliers 140, 141, 142, 143, 144, and 145 can each be implemented as a Gilbert transconductance multiplier which is depicted in FIG. 8. The vector multipliers 120, 121, 122, 123, 124, 125, 150, 151, 152, 153, 154, and 155 can each be implemented as a combination of a summing circuit and a scalar multiplier circuit since the dot product $\vec{\Omega}_A \cdot \vec{\Omega}_B = \Omega_A^1\Omega_B^1 + \Omega_A^2\Omega_B^2 + \ldots + \Omega_A^n\Omega_B^n$.

The SO-columns 20 can also be implemented as analog circuits. With reference to FIG. 5, simple cells and Lie germs 30, 31, 32, 33, 34, 35, 36 in the SO-columns 20 generally comprise a massively array of resistors with multiple inputs.

The implementation of the SO-columns 20 and the LSE network 22 as realtime analog circuit is advantageous in such application as robotics because of their low energy consumption. These components 20 and 22 can also be implemented at realtime frame rates using high speed digital hardware such as a processor controlled connection system designed for use in neural network system.

Although the present invention has been described with reference to a preferred embodiment, the invention is not limited to the details thereof. Various modifications and substitutions will occur to those of ordinary skill in the art, and all such modifications and substitutions are intended to fall within the spirit and scope of the invention as defined in the appended claims.

What is claimed is:

1. An artificial neural system for extracting local image affine flow information from visual stimuli comprising:

a) time differentiation means for receiving time-varying image intensity signal and providing image time-derivative signal;

b) hypercolumn (HC) reference frame means coupled to said time differentiation means for receiving said image time-derivative signal and providing HC-time-derivative signal;

c) hypercolumn (HC) Lie differentiation means for receiving image intensity signal and providing six HC-Lie-derivative signals;

d) least square error fitting means coupled to said HC-reference frame means and said HC-Lie differentiation means for receiving HC-time-derivative signal and six HC-Lie-derivative signals and determining local affine flow.

2. The system of claim 1, wherein said HC-reference frame means comprising a plurality of specific orientation (SO) simple cell means.

3. The system of claim 2, wherein said SO-simple cell means comprising permanent memory means for preserving an array of fixed weights, and weighted summing means for receiving input pattern signal and producing SO-response signal.

4. The system of claim 3, wherein said array of fixed weights is constructed according to a particular rapid descent analytical function describing the receptive field of said SO-simple cell.

5. The system of claim 1, wherein said HC-Lie differentiation means comprising six Lie-derivative operator means, for receiving said image intensity signal and producing HC-Lie-derivative signal.

6. The system of claim 5, wherein said Lie-derivative-operator means further comprising a plurality of specific orientation (SO) Lie germ means.

7. The system of claim 6, wherein said SO-Lie germ means of said Lie-derivative-operator means comprising permanent memory means for preserving an array of fixed weights, and weighted summing means for receiving input pattern signal and producing SO-Lie germ response signal.

8. The system of claim 7, wherein said array of fixed weights is constructed according to function analytically derived by applying the Hilbert space conjugate of the infinitesimal generator corresponding to said Lie-derivative-operator to said analytical function describing the receptive field of said SO-simple cell.

9. The system of claim 1, wherein said least square error fitting means comprising six affine parameter extraction means, each corresponding to one of six affine parameters of the two dimensional affine Lie group.

10. The system of claim 9, wherein said affine parameter extraction means comprising affine parameter predict means, affine parameter increment means, and affine parameter adjusting means.

11. The system of claim 10, wherein said affine parameter predicting means comprising temporal Lie-derivative-memory means coupled with Lie-derivative-operator means for receiving and temporally preserving six HC-Lie-derivative signal, inner-producting means coupled with temporal time-derivative-memory means and temporal Lie-derivative-memory means for receiving said HC-time-derivative signal and said HC-Lie-derivative signal and producing affine parameter predict signal.

12. The system of claim 10, wherein said affine parameter increment means comprising vector-projecting means coupled with said vector weighted summing means and said temporal Lie-derivative-memory means for receiving vector weighted sum signal and HC-Lie-derivative signal and producing vector-projection signal, subtracting means coupled with said affine parameter predicting means and said vector-projecting means for receiving temporal affine parameter signal and vector-projection signal and producing increment signal.

13. The system of claim 10, wherein said parameter adjust means coupled with parameter predict means and parameter increment means for receiving predict affine parameter signal and increment signal and producing incrementally adjusted affine parameter signal.

14. The system of claim 9 additionally comprising a temporal time-derivative-memory means coupled with HC-reference frame means for receiving and temporally preserving HC-time-derivative signal.

15. The system of claim 14 additionally comprising vector weighted summing means coupled with temporal Lie-derivative-memory means and affine parameter adjusting means for receiving six HC-Lie-derivative signals and six adjusted parameter signals and producing vector weighted sum signal.

16. In an artificial neural system including time differentiator means for receiving time-varying intensity image signal and providing time-derivative image signal, HC-reference frame means for receiving time-derivative image signal and providing HC-time-derivative signal, HC-Lie differentiation means for receiving intensity image signal and providing HC-Lie derivative signals, least squares error fitting means for receiving said HC-time-derivative signal and HC-Lie-derivative signals and providing affine flow signal, the method for determining the affine flow of the time-varying image comprising the steps of:

differentiating said time-varying intensity image by time-differentiation means;

extracting HC-time-derivative $\vec{\Omega}_t$ from said time-derivative image by using SO-simple cells in said HC-reference frame to obtain each said SO-simple cell response signals;

extracting HC-Lie-derivatives $\vec{\Omega}_1, \vec{\Omega}_2, \vec{\Omega}_3, \vec{\Omega}_4, \vec{\Omega}_5, \vec{\Omega}_6$ SO-Lie-germ response signals from said intensity image by using said SO-Lie germs of said Lie derivative operators to obtain each said SO-Lie-germ response signals;

applying said HC-time-derivative and said six HC-Lie-derivatives to respective least squares error fitting circuit to explicitly determine six affine flow component parameters $\rho_1, \rho_2, \rho_3, \rho_4, \rho_5,$ and $\rho_6$.

17. The method of claim 16, wherein said least square error fitting circuit are configured to perform least squares error fit analysis to said HC-time-derivative $\vec{\Omega}_t$ and linear combination of said HC-Lie-derivatives for the following error function:

$$E(\rho) = \|\vec{\Omega}_t - \sum_{i=1}^{6} \rho_i \vec{\Omega}_i\|^2$$

where $\rho=(\rho_1, \rho_2, \rho_3, \rho_4, \rho_5, \rho_6)$.

18. The method of claim 17, further comprising steps of determining predicted affine parameter by inner products of said HC-time derivative with said HC-Lie-derivatives, respectively:

$$\rho_i = \vec{\Omega}_i \cdot \vec{\Omega}_t, i=1, \ldots, 6.$$

19. The method of claim 18, further comprising the steps of operating said least square error fitting circuit to determine affine parameter increments $\Delta\rho_i$, i=1, ..., 6:

generating linear combination of HC-Lie derivatives using said predicted affine flow component parameters as coefficients $$\sum_{i=1}^{6} \rho_i \vec{\Omega}_i$$

projecting said linear combination of HC-Lie derivatives to each HC-Lie-derivative $$\vec{\Omega}_i \cdot \sum_{j=1}^{6} \rho_j \vec{\Omega}_j, i=1, \ldots, 6;$$

subtracting $\vec{\Omega}_t \cdot \vec{\Omega}_i$ from $$\vec{\Omega}_i \cdot \sum_{j=1}^{6} \rho_j \vec{\Omega}_j,$$

i=1, ..., 6, and taking the difference as affine parameter increments $$\Delta\rho_i = \vec{\Omega}_i \cdot \left( \vec{\Omega}_t - \sum_{j=1}^{6} \rho_j \vec{\Omega}_j \right), i=1, \ldots 6.$$

20. The method of claim 19, further comprising steps of using the said increments as correcting force to incrementally adjust each of the six affine flow component parameters in accordance with error minimization gradient dynamical system technique to determine said six affine flow component parameters as signals along said parameter adjust means.

* * * * *